Figure 1:
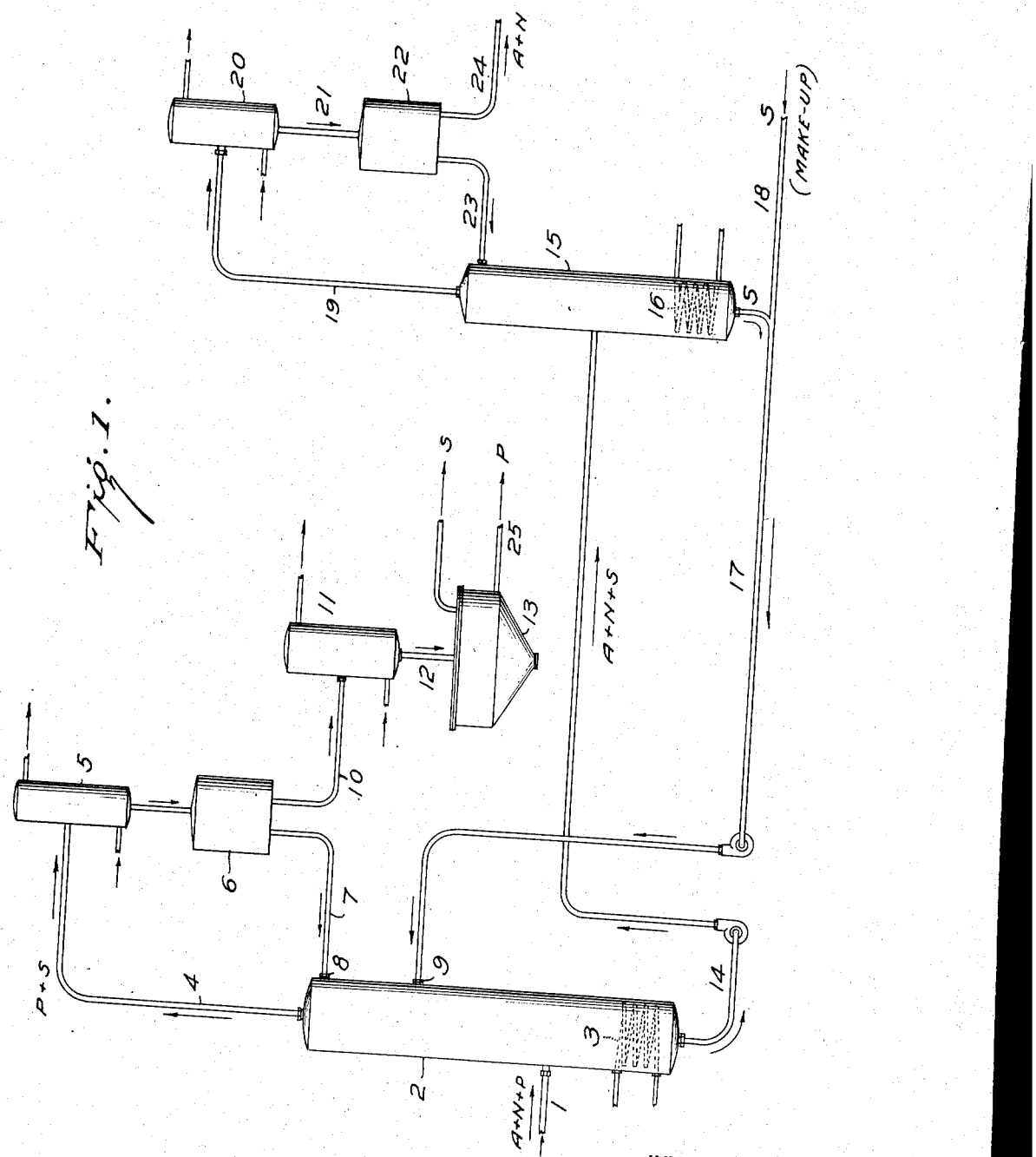

Oct. 13, 1953

H. B. H. COOPER ET AL 2,655,467

PROCESS FOR SEPARATING PREDOMINANTLY AROMATIC HYDROCARBONS FROM PREDOMINANTLY SATURATED HYDROCARBONS BY EXTRACTIVE DISTILLATION

Filed May 27, 1952

5 Sheets-Sheet 1

INVENTORS
HAL B. H. COOPER,
EUGENE C. MEDCALF,
BY
ATTORNEY

Patented Oct. 13, 1953

2,655,467

UNITED STATES PATENT OFFICE 2,655,467

PROCESS FOR SEPARATING PREDOMINANTLY AROMATIC HYDROCARBONS FROM PREDOMINANTLY SATURATED HYDROCARBONS BY EXTRACTIVE DISTILLATION

Hal B. H. Cooper and Eugene C. Medcalf, Bound Brook, N. J., assignors to American Cyanamid Company, New York, N. Y., a corporation of Maine Application May 27, 1952, Serial No. 290,292

10 Claims. (Cl. 202—39.5)

This invention relates to an improved process for separating predominantly aromatic compounds, such as naphthalene, from predominantly saturated compounds by means of extractive distillation. More particularly, the process relates to the treatment of mixtures obtained in petroleum refining or processing which contain both predominantly aromatic and predominantly saturated constituents which boil so close to the same temperature that separation by ordinary means is not feasible.

In recent years many of the products obtained from various cracking processes in petroleum refining contain considerable quantities of aromatic hydrocarbons, such as naphthalene. Typical products are the so-called "light cycle gas oils." The fractions containing naphthalene may be considered as having, in the main, three types of constituents. The bulk of the product is formed of saturated hydrocarbons, such as dodecane. There is a considerable portion of naphthalene and some alicyclic compounds, such as naphthene. Separation of the aromatic compounds from paraffins presents a considerable problem. In the first place, the presence of these cyclic compounds reduces the value of the paraffin for certain fuels, for example, fuels for jet engines; and the aromatics, such as naphthalene, command a good price and constitute a considerable source of naphthalene used in the synthetic organic chemical industry. Separation of aromatics by ordinary fractional distillation is not satisfactory because the boiling points are too near, and formation of azeotropes renders a sharp separation impractical on a commercial scale.

Aromatics have been removed by solvent processes and there have also been used processes involving the so-called "extractive distillation" in which an additional compound is added which changes the relative vapor pressures of the constituents of the hydrocarbon mixtures sufficiently to permit effective separation by fractional distillation. It is with this latter type of process that the present invention deals.

Extractive distillation requires that there be induced by the added solvent a wide difference in volatility between the constituents of the hydrocarbon mixture; and it also requires reasonably complete and easy separation of the solvent, both from the paraffin fraction and from the aromatics. Also, it is desirable, of course, to use solvents which do not present serious corrosion hazards.

Among the solvents used in extractive distillation, in the past, has been dimethyl phthalate, and this solvent may be considered as representative of the best solvents of the prior art. It is possible with dimethyl phthalate to effect a practical separation of aromatics and other cyclic constituents from a mixture such as light cycle gas oil. However, the ester leaves much to be desired. In the first place, it produces only a moderate difference in volatility of the constituents and separation of the ester, which is a high-boiling liquid, from the condensed paraffin fraction in which it is present in small quantity, is not easy or complete. Since the ester sells for a price much higher than the hydrocarbons, incomplete separation represents a serious economic loss.

The present invention deals with an improved extractive distillation process using phthalic anhydride as a solvent. This product which is normally a solid combines to a high degree all of the desirable features of a solvent for use in extractive distillation. It exerts a very strong depression on the vapor pressures of the predominantly aromatic constituents of the hydrocarbon mixture and increases the volatilization of the predominantly saturated constituents. It has a sufficiently high boiling point so that but little is lost and its solubility in the predominantly saturated hydrocarbons is so low that it can be simply and easily separated out by chilling and filtering. In addition to the above technical advantages, phthalic anhydride is relatively cheap, available in huge quantities and presents no significant corrosion problem. In every respect phthalic anhydride is markedly superior to the best solvents used in the past, such as dimethyl phthalate, and the technical and economic advantages are obtained without any corresponding disadvantage.

The present invention is applicable to mixtures of hydrocarbons containing both predominantly aromatic and predominantly saturated constituents boiling at similar boiling points. By "predominantly aromatic" is meant hydrocarbons in which at least half of the weight of the molecule is in the form of benzenoid rings and less than half in the form of saturated chains or rings. The predominantly saturated constituent consists of hydrocarbons having not more than one olefinic double bond per six carbon atoms. In other words, it includes not only the paraffins which are 100% saturated but also compounds such as cyclohexane and even somewhat unsaturated compounds such as dodecane or cyclohexene.

There is one other limitation to the mixtures which are capable of effective treatment by means of the present invention and this is the obvious one that the mixture must have a boiling point below that of the phthalic anhydride, preferably at least 30° C.; otherwise the latter will not remain in the liquid form and will not exert its function as an extractive distillation solvent. Many of the most important mixtures for which the present invention is suitable are those containing pure aromatic compounds such as naphthalene and paraffin hydrocarbons of similar boiling points. However, excellent separation may be made when the compound is not 100% aromatic, for example, tetralin in which more than half of the weight of the molecule is in the form of the benzenoid ring can be effectively separated from paraffin hydrocarbons of similar boiling points. Alternatively, tetralin can be separated from the completely saturated decalin by means of the present process. In the treatment of most products from the refining of petroleum, which is the most important single field for the present invention, the mixtures are normally heterogeneous. Thus, for example, there may be more than one predominantly aromatic compound associated with several predominantly saturated hydrocarbons. It is an advantage of the process that it can be used with crude mixtures as well as in the separation of mixtures of a single aromatic hydrocarbon with a single saturated hydrocarbon.

It is an advantage of the present invention that phthalic anhydride can easily be removed completely where this is necessary because it is possible to take out small traces of phthalic anhydride from either an aromatic hydrocarbon or a predominantly saturated hydrocarbon because the phthalic anhydride is soluble in aqueous caustic alkali solutions. The possibility of removing even small traces of the extractive solvent is sometimes of importance where products of the greatest purity are necessary. This advantage is a marked one over other solvents which have been used in the past such as dimethyl phthalate which presents a serious problem when absolute purity of product is necessary.

The operation of the invention is simple, phthalic anhydride being soluble in the predominantly aromatic component and therefore lowering its vapor pressure while at the same time the partial vapor pressure of the predominantly saturated hydrocarbon is increased. A vapor pressure difference is thus created which permits sharp separations in equipment of practical size and capacity. Fractional distillation columns of conventional design may be used. As pointed out above, where extreme purity is necessary, traces of phthalic anhydride may be removed from either component by washing with caustic alkali.

Figure 2:
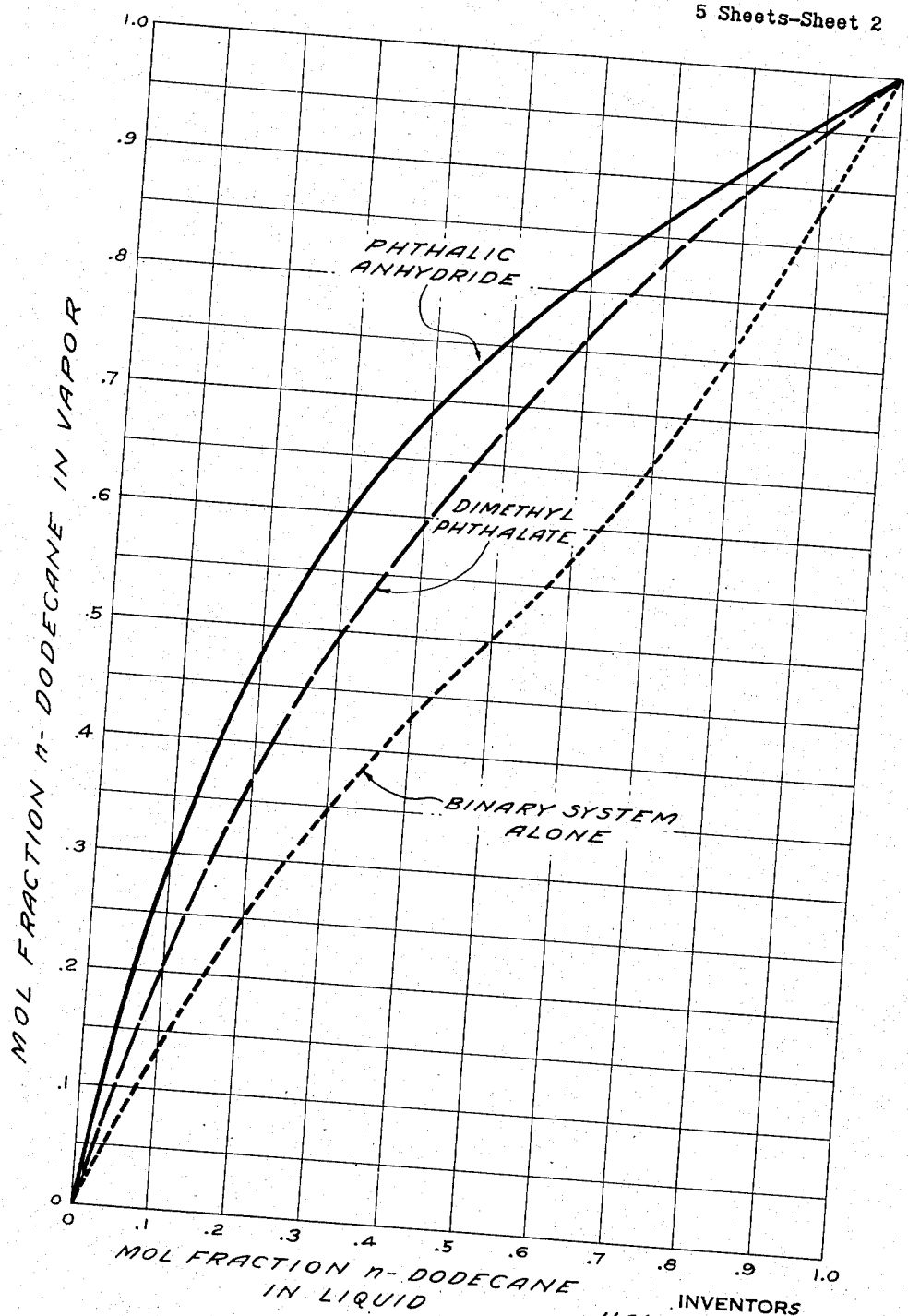
Figure 3:
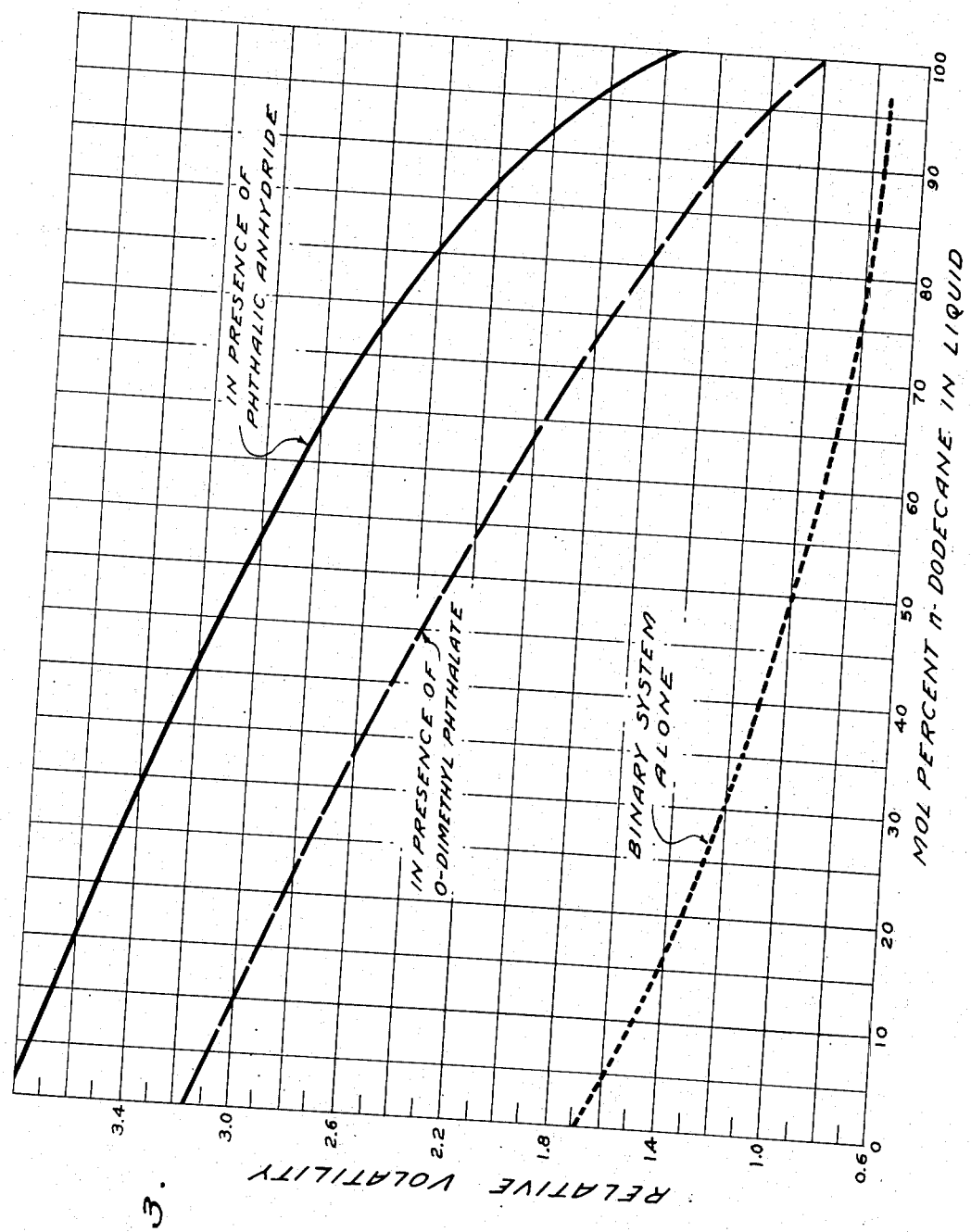
Figure 4:
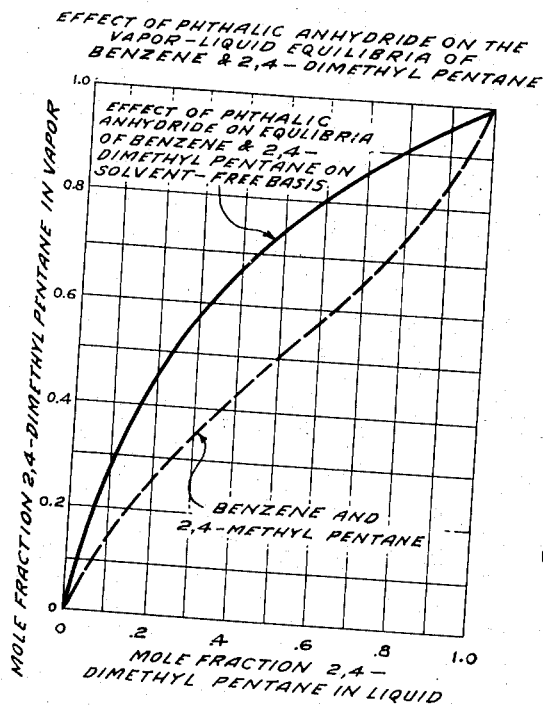
Figure 5:
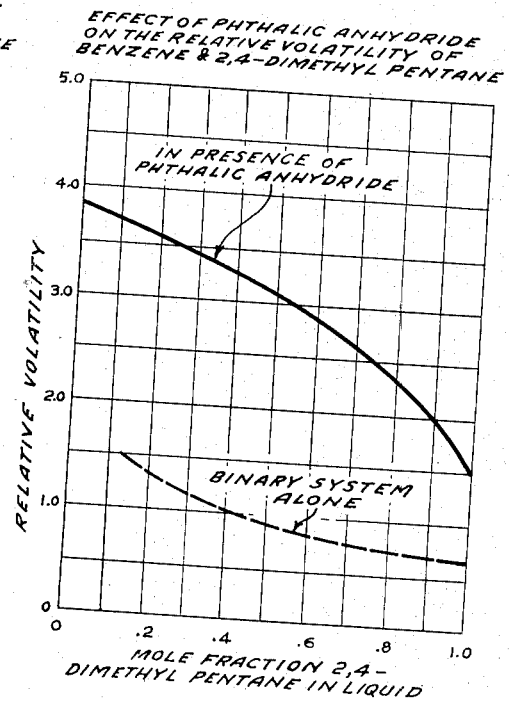
Figure 6:
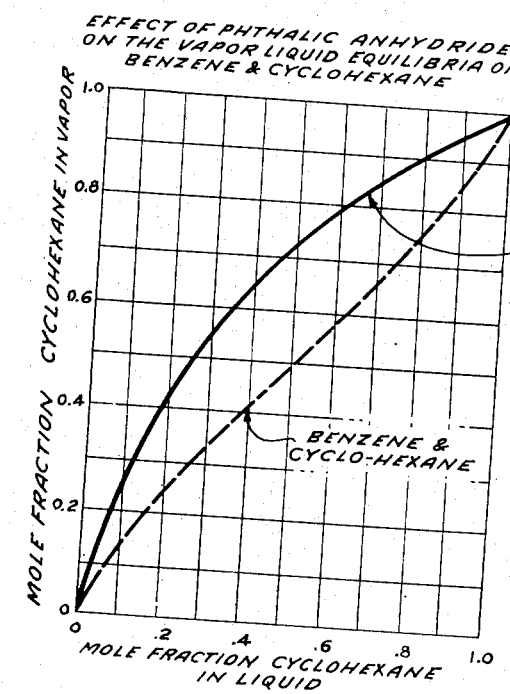
Figure 7:
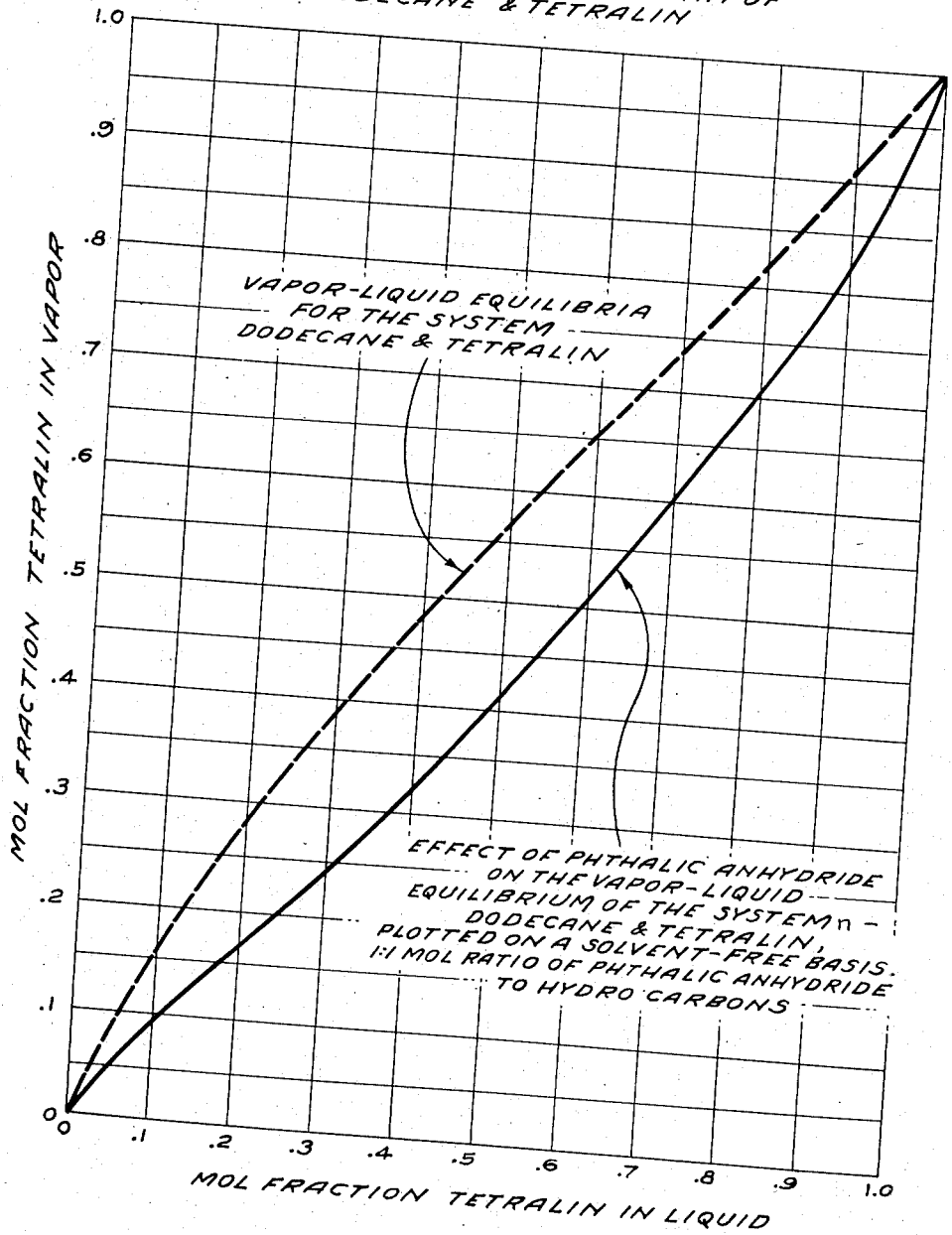

The invention will be described in greater detail in conjunction with the drawings in which:

Fig. 1 is a diagrammatic representation of a typical plant using the present invention; and Fig. 2 is a graph showing the increased separation of dodecane from naphthalene in the presence of phthalic anhydride and dimethyl phthalate; and Fig. 3 is a curve showing the change in relative volatility of dodecane and naphthalene in the presence of phthalic anhydride and dimethyl phthalate; and Fig. 4 is a graph showing the increased separation of 2,4-dimethylpentane from benzene in the presence of phthalic anhydride; and Fig. 5 is a graph showing the change in relative volatility of benzene and 2,4-dimethylpentane in the presence of phthalic anhydride; and Fig. 6 is a graph showing the increased separation of cyclohexane from benzene in the presence of phthalic anhydride; and Fig. 7 is a graph showing increased separation of dodecane from tetralin in the presence of phthalic anhydride.

Figs. 2 and 3 show clearly the marked increase in the volatility of dodecane as compared to naphthalene brought about by adding phthalic anhydride. It will be noted that throughout the useful range of mixtures of dodecane and naphthalene, the increase in volatility of the former is almost half again as great in the presence of phthalic anhydride as in the presence of dimethyl phthalate. Fig. 3 shows a similar effect with various percentages of dodecane and naphthalene. Thus, for instance, at 50%, which is used commonly, for comparison purposes, the increase in relative volatility of dodecane to naphthalene is about 2¼ times with dimethyl phthalate, and over three times with phthalic anhydride.

Figs. 4 and 5 show that phthalic anhydride has a similar effect in enhancing the separation of benzene and 2,4-dimethylpentane in a petroleum fraction containing them and the changes in volatility of the two constituents which are effected by the phthalic anhydride. For equimolecular mixtures, the relative volatility, when phthalic anhydride is present, is 3.5 times that of the binary system alone.

Fig. 6 shows that the separation of benzene and cyclohexane is likewise greatly facilitated by the presence of phthalic anhydride. Pressure is of course needed to maintain the reaction above the melting point of phthalic anhydride. In a similar manner, Fig. 7 shows improved separation of dodecane and tetralin.

The above figures show the effect of phthalic anhydride on the vapor-liquid equilibria of four of the many possible mixtures of a saturated hydrocarbon, or mixtures of saturated hydrocarbons, with predominantly aromatic cyclic hydrocarbons, which present difficulties in separation by ordinary distillation. Practically any aromatic hydrocarbon or alkyl derivative thereof, such as benzene, toluene, xylene, tetralin, alpha- and beta-methylnaphthalene, and similar types of predominantly aromatic compounds, give vapor-liquid diagrams, when mixed with saturated hydrocarbons of similar boiling points, similar to those of the foregoing figures. The relative volatilities in the presence of phthalic anhydride vary somewhat with the particular mixtures used; but the variations are not great and the use of phthalic anhydride brings out comparable improvements in separation in each case.

The drawings have shown two component mixtures in order to give accurately reproducible figures. It should be understood that in commercial practice perfect two-component mixtures are seldom encountered; however, the behavior of multicomponent mixtures, where several saturated hydrocarbons and predominantly aromatic hydrocarbons of similar boiling ranges are encountered, show the same general behavior with phthalic anhydride, thus permitting the improvements of the present invention to be obtained in the practical separation of many petroleum fractions, which hitherto have been most difficult to separate. Of course, when a polycomponent mixture is treated, pure compounds will not be produced. In other words, if there are two or more saturated hydrocarbons of comparable boiling point present in the mixture, they will be recovered together; and the same applies to the aromatic hydrocarbons.

A typical extractive distillation process will be described in connection with Fig. 1. In this figure, a light cycle gas oil containing 20% of naphthalene, 75% of paraffins and naphthenes, 4.5% of alkylated aromatics and .5% of olefins, symbolized on the diagrammatic drawing of Fig. 1 by the letters A, N, and P, is introduced into a typical extractive distillation still 1, at a point just below the middle of column 2. Heat is supplied by the heating coil 3, supplying the necessary heat for the extractive distillation process. The solvent, phthalic anhydride, symbolized on the drawing by the letter S, is introduced part way up column 2 at 9, its temperature being about 225° C. and flows down through the plates of the column, contacting the upwardly rising vapors and reducing the vapor pressure of the aromatics while increasing the volatilization of the paraffin and other saturated hydrocarbons. As a result, the liquid in the bottom of the still contains most of the phthalic anhydride solvent carrying in solution the aromatics.

The upper portion of the column 2 above the solvent inlet 9 is a conventional solvent stripping section in which a considerable portion of vaporized phthalic anhydride is condensed and flows down the column. Vapors containing mostly saturated hydrocarbons with a very small amount of solvent leave through the pipe 4, passing through a condenser 5, where they are condensed and flow into the reflux accumulator 6. The percentage of phthalic anhydride is approximately six percent, which represents the azeotropic composition of phthalic anhydride and saturated hydrocarbons.

The portion of the liquid from the accumulator 6 flows back as reflux through pipe 7 into the column 2, entering at the point 8 at the top of the solvent-stripping section. The rest of the liquid passes from 6 through pipe 10 to the cooler 11. The temperature of the liquid is brought down below the melting point of phthalic anhydride; for example, to approximately 20° C., and the latter crystallized out, the slurry of crystals passing through the pipe 12 into a centrifuge 13, where the liquid paraffins are discharged to storage through the pipe 25, and the solvent crystals are removed as a solid cake. The loss of phthalic anhydride is very slight, as it is soluble in the paraffins only to about 0.1 percent.

For most purposes the minute amount of phthalic anhydride dissolved in the saturated hydrocarbons is unobjectionable. If, however, very pure hydrocarbons are required, the last traces of phthalic anhydride may be removed by conventional means, such as a wash with aqueous caustic alkali.

The liquid from the bottom of the still, which is a solution of aromatics and phthalic anhydride, passes through the pipe 14 and is introduced into the middle of the solvent recovery still 15, provided with a reboiler 16. As the aromatics are more volatile than phthalic anhydride, the latter passes out through the bottom of the still and is recirculated through the pipe 17 to the column 2, additional make-up phthalic anhydride being introduced through the pipe 18. Vapors of aromatics pass out of the top of the column through pipe 19 to condenser 20, where the condensed liquid flows down through pipe 21 into a reflux accumulator 22. A portion of the liquid from the latter is introduced through the pipe 23 into the top of the solvent recovery still 15, the bulk passing through the pipe 24 to storage.

This application is in part a continuation of our copending applications, Serial No. 97,016, filed June 3, 1949, and Serial No. 187,876, filed September 30, 1950.

We claim:

1. A process of separating predominantly aromatic hydrocarbons from predominantly saturated hydrocarbons of similar boiling points which comprises subjecting a mixture of hydrocarbons having at least half their molecular weight in benzenoid rings and hydrocarbons of similar boiling point having less than one double bond per six carbon atoms, the mixture having a boiling point below that of phthalic anhydride to distillation under partial reflux counter-current, to a stream of molten phthalic anhydride whereby the vapor pressure of the predominantly aromatic constituents of the mixture is decreased and the vapor pressure of the predominantly saturated components is increased, the predominantly saturated hydrocarbons being obtained as an overhead and a solution of phthalic anhydride and the predominantly aromatic hydrocarbons being obtained from the still in liquid form.

2. A process according to claim 1 in which the vapors containing the predominantly saturated hydrocarbons are condensed and cooled to a temperature at which solid phthalic anhydride present precipitates out and recovering the latter in solid form.

3. A process according to claim 2 in which the hydrocarbon mixture is a petroleum product containing naphthalene as the predominantly aromatic hydrocarbon constituent.

4. A process according to claim 1 in which the hydrocarbon mixture is a petroleum product containing naphthalene as the predominantly aromatic hydrocarbon constituent.

5. A process according to claim 1 in which the predominantly aromatic hydrocarbon fraction in admixture with molten phthalic anhydride is removed and the two constituents are separated by distillation.

6. A process according to claim 5 in which the mixture is a petroleum product containing naphthalene as the predominantly aromatic hydrocarbon constituent.

7. A process according to claim 1 in which the hydrocarbon mixture is a petroleum product containing benzene.

8. A process according to claim 1 in which the hydrocarbon mixture comprises benzene and cyclohexane.

9. A process according to claim 1 in which the hydrocarbon mixture contains tetralin as a predominantly aromatic hydrocarbon constituent.

10. A process according to claim 1 in which the mixture contains dodecane as the predominantly saturated component.

HAL B. H. COOPER.
EUGENE C. MEDCALF.

References Cited in the file of this patent

UNITED STATES PATENTS

| Number | Name | Date |
|---|---|---|
| 2,168,691 | Voorhees | Aug. 8, 1939 |
| 2,215,915 | Cope | Sept. 24, 1940 |
| 2,370,530 | Gage | Feb. 27, 1945 |